(12) United States Patent
Alon (10) Patent No.: US 10,565,867 B2
(45) Date of Patent: Feb. 18, 2020

(54) DETECTION AND DOCUMENTATION OF TAILGATING AND SPEEDING VIOLATIONS

(71) Applicant: Roadmetric Ltd, Jerususalem (IL)

(72) Inventor: Yaniv Alon, Giveat Yearim (IL)

(73) Assignee: Roadmetric Ltd., Jerusalem (IL)

( * ) Notice: Subject to any disclaimer, the term of this patent is extended or adjusted under 35 U.S.C. 154(b) by 81 days.

(21) Appl. No.: 15/574,159

(22) PCT Filed: May 17, 2016

(86) PCT No.: PCT/IB2016/052849
§ 371 (c)(1),
(2) Date: Nov. 15, 2017

(87) PCT Pub. No.: WO2016/185373
PCT Pub. Date: Nov. 24, 2016

(65) Prior Publication Data
US 2018/0137754 A1    May 17, 2018

(30) Foreign Application Priority Data
May 18, 2015   (GB) .................................... 1508485.8

(51) Int. Cl.
*G08G 1/04* (2006.01)
*G06T 7/20* (2017.01)
(Continued)

(52) U.S. Cl.
CPC ........... *G08G 1/04* (2013.01); *G06K 9/00785* (2013.01); *G06K 9/00791* (2013.01); *G06T 7/20* (2013.01);
(Continued)

(58) Field of Classification Search
USPC .... 348/118, 116, 61, 64, 73, 87, 94, 95, 107
See application file for complete search history.

(56) References Cited

U.S. PATENT DOCUMENTS 5,809,161 A      9/1998   Auty et al.
6,124,647 A  *   9/2000   Marcus ............... B60C 23/0401
                                                        307/10.1
(Continued)

FOREIGN PATENT DOCUMENTS

DE      19772728946        1/2019
GB      1508485.8          11/2016
(Continued)

*Primary Examiner* — Daquan Zhao
(74) *Attorney, Agent, or Firm* — Dr. Hanan Farber Patent Agent Ltd.

(57) ABSTRACT

Determining that a trailing vehicle is tailgating a lead vehicle while both are traveling on a lane of a road. A camera captures a timed sequence of image frames at known capture times of the lead vehicle and the trailing vehicle. Images of the trailing vehicle and the lead vehicle are selected from the captured image frames to provide respective image coordinates of the trailing vehicle and the lead vehicle. Multiple world space differential distances between the trailing vehicle and the lead vehicle are computed responsive to the image coordinates in the selected image frames. A tailgating metric responsive to the known capture times of the selected image frames and the computed world space differential distances is determined.

20 Claims, 9 Drawing Sheets

(51) Int. Cl.
  *G06T 7/70* (2017.01)
  *G08G 1/017* (2006.01)
  *G06T 7/246* (2017.01)
  *G06T 7/292* (2017.01)
  *G06K 9/00* (2006.01)
  *H04N 5/247* (2006.01)

(52) U.S. Cl.
  CPC .............. *G06T 7/251* (2017.01); *G06T 7/292* (2017.01); *G06T 7/70* (2017.01); *G08G 1/0175* (2013.01); *H04N 5/247* (2013.01); *B60Y 2400/3015* (2013.01); *G06T 2207/10016* (2013.01); *G06T 2207/30236* (2013.01); *G06T 2207/30252* (2013.01)

(56) References Cited

U.S. PATENT DOCUMENTS

2003/0210807 A1* 11/2003 Sato ................... G06K 9/00805
  382/104
2013/0215273 A1    8/2013 Kareev et al.
2015/0307025 A1* 10/2015 Hedley ................... B60Q 1/30
  701/36

FOREIGN PATENT DOCUMENTS

| WO | WO2005069248 | 7/2005 |
| WO | WO2008027221 A2 | 3/2008 |

* cited by examiner

DETECTION AND DOCUMENTATION OF TAILGATING AND SPEEDING VIOLATIONS

BACKGROUND

1. Technical Field

Aspects of the present invention relate to detection and documentation of tailgating and speeding violations.

2. Description of Related Art

United States patent application publication US2011/0234749 by the same inventor, discloses a system for detecting and recording real-time law violations. A law enforcement motor vehicle is equipped with an array of cameras providing multiple image streams over a substantially 360° field of view around the law enforcement motor vehicle.

Tailgating is an unsafe practice performed by a driver of a trailing vehicle following a lead vehicle too closely on a road. The German Highway code defines the driving offense of tailgating as traveling too closely to the vehicle in front. The German Highway Code (Straßenverkehrsordnung, StVO) does not specify a minimum distance to a lead vehicle. The code section 4 states that a driver must leave enough distance to the vehicle in front in order to be able to stop if the lead vehicle brakes suddenly. For heavy goods vehicles on the other hand, the German Highway Code specifies a minimum distance of at least 50 metres (see § 4(3) StVO). German case law requires that a car traveling on a dual carriageway or other high-speed road should maintain a minimum distance to the lead vehicle specified by the speed of travel during 1.5 seconds. The minimum distance may be 250-300 metres. Momentarily traveling less than the minimum distance to the lead vehicle in front should not result in an infraction. In addition, the prosecution is expected to prove that the act of tailgating caused a danger to other road users. Proving the act of tailgating caused a danger to other road users may be essentially a question of judgment and open to dispute.

The United Kingdom highway code defines driving too closely to lead vehicle in terms of a stopping distance which includes a thinking distance added to a braking distance. The thinking distance depends on the attention of the driver whilst the braking distance takes into consideration the road surface, the type of weather conditions and the condition of the vehicle. A vehicle traveling at 64 kilometres per hour (kph) has a stopping distance of 36 meters which includes 12 meters of thinking distance and 24 meters of braking distance. In contrast, a vehicle traveling at 112 KPH has a stopping distance of 96 meters which includes 21 meters of thinking distance and 75 meters of braking distance.

Various systems and methods for detecting tailgating violations have been proposed. The abstract of "A Mobile Tailgating Detection System for Law Enforcement Surveillance." (Zellmer, Tyler J., et al., ASME 2014 Dynamic Systems and Control Conference. American Society of Mechanical Engineers, 2014) notes that "Tailgating is difficult to detect and document using visual methods and law enforcement agencies must depend on trained officers, whose abilities may be limited". (emphasis added) The proposed tailgating detection system is mounted on a law enforcement patrol host vehicle which continuously monitors both passenger and commercial vehicles, as the host vehicle travels along the roadway. A rotating laser range-finding sensor feeds information to a microprocessor that continuously searches for the occurrence of tailgating. A weighting algorithm determines when a tailgating event has definitively occurred to reduce system sensitivity. If an event is detected, the officer is notified with audio and visual cues. A time stamped record including all relevant system information for later use in legal prosecution is also produced.

Laser radar or LIDAR used to detect speeding violations has been used also for detecting tailgating. However, LIDAR systems detect tailgating only when directed in line with the road on which vehicles are traveling.

Thus, there is a need for and it would advantageous to have a system a method for visually determining that a trailing vehicle is tailgating a lead vehicle when viewed from various directions.

BRIEF SUMMARY

Various computerized methods and systems are described herein for determining that a trailing vehicle is tailgating a lead vehicle while both are traveling on a lane of a road with the trailing vehicle following the lead vehicle. A camera captures a timed sequence of image frames at known capture times of the lead vehicle and the trailing vehicle. Images of at least a part of the trailing vehicle and at least of part of the lead vehicle are selected from the captured image frames to provide respective image coordinates of the trailing vehicle and the lead vehicle in the selected images. Multiple world space differential distances between the trailing vehicle and the lead vehicle are computed responsive to the image coordinates in the selected image frames. A tailgating metric responsive to the known capture times of the selected image frames and the computed world space differential distances is determined.

A first image point may be selected corresponding to an object point on the trailing vehicle and a second image point may be selected corresponding to an object point on the lead vehicle. The first and second image points correspond to a line in world space parallel to or included in the plane of the road. The line is substantially parallel to the direction of motion of the trailing vehicle and the lead vehicle. The world space differential distances computed are substantially along the line.

The captured image frames including the selected images may include both the part of the trailing vehicle and the part of the lead vehicle or the part of the trailing vehicle and the part of lead vehicle may be in different selected image frames.

A vehicle model of the trailing vehicle and/or the lead vehicle may be recognized from the captured image frames. One or more dimensions of the vehicle model may be known, the computation of the world space differential distances may be responsive to the known dimension(s) of the recognized vehicle model.

The image frames may be captured by a camera with an optical axis substantially perpendicular to the direction of motion of the vehicles, i.e. viewing from the side, and the distance between the trailing vehicle and the lead vehicle may be determined relative to the known dimension(s) of the vehicle model.

The image frames may be captured by a camera with an optical axis substantially parallel to the direction of motion of the vehicles and the distance between the trailing vehicle and the lead vehicle is determined relative to the known at least one dimension of the car model.

One or more of the selected images may provide an image of a license plate of the trailing vehicle. The license number may be recognized to associate with and to determine the vehicle model of the trailing vehicle.

The computation of the the world space differential distances may be further responsive to a range (or Z Cartesian coordinate) to at least one of the trailing vehicle and the lead vehicle. The range may be determined from the image frames or measured independently from the image frames using another sensor.

A speed of the trailing vehicle and/or the lead vehicle may be computed responsive to the known capture times of the selected image frames and world space coordinates (X,Z) of the trailing vehicle and/or the lead vehicle computed from the image coordinates.

The tailgating metric may be determined based on the computed world space differential distances and the speed. The tailgating metric may be determined further based on a time interval between respective capture times of two of the selected captured image frames.

The camera may be mountable on a host vehicle and may be connected to a processor and the processor may be connected to a CAN bus of the host vehicle. While the host vehicle is traveling in a lane of the road parallel to the lane of the road on which the lead vehicle and the trailing vehicle are traveling, the speed of the host vehicle may be input to the processor from the CAN bus and the speed of the trailing vehicle and/or the lead vehicle may be determined relative to the speed of the host vehicle. While the host vehicle is parked, the speed of at least one of the trailing vehicle and the lead vehicle may be determined by computing world coordinates (X,Z) from the image coordinates at the known capture times.

Various systems are provided mountable on a host vehicle for determining that a trailing vehicle is tailgating a lead vehicle while both the trailing vehicle and the lead vehicle are traveling on a lane of a road with the trailing vehicle following the lead vehicle. Multiple cameras are mountable on the host vehicle with overlapping fields of view. A processor is configured to capture from the cameras timed sequences of image frames at known capture times of the lead vehicle and the trailing vehicle. The capture of the timed sequences of images frames are synchronized. The processor is further configured to input speeds of the host vehicle from the CAN bus of the host vehicle, for example. Corresponding image points are selected from the captured image frames between the synchronized image frames of at least a part of the trailing vehicle and at least of part of the lead vehicle to provide respective image coordinates of the trailing vehicle and the lead vehicle in the selected images. Multiple world space differential distances are computed between the trailing vehicle and the lead vehicle responsive to the image coordinates of the corresponding image points in the synchronized image frames. A tailgating metric may be determined responsive to the known capture times of the selected image frames, the computed world space differential distances and the speeds of the host vehicle.

BRIEF DESCRIPTION OF THE DRAWINGS

The invention is herein described, by way of example only, with reference to the accompanying drawings, wherein.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to the like elements throughout. The features are described below to explain the present invention by referring to the figures.

By way of introduction, various embodiments of the present invention may be used to provide sufficient evidence to enforce existing regulations. As discussed in the background section, visual methods using cameras installed on law enforcement vehicles have not been used to enforce tailgating regulations. There may have been technical prejudice against the use of mobile cameras because it may have been assumed that a full camera calibration, that is position and full orientation of the cameras must be determined in order to provide the evidence necessary for prosecution. As shown in the ensuing description, if differential measurements are used, a full camera calibration is not necessary to accurately determine that a tailgating infraction has occurred. Moreover, the acceptance of systems and methods as described in the description as follows may enable jurisdictions to more accurately define tailgating in their regulations so that the new regulations may be properly enforced.

Figure 1:
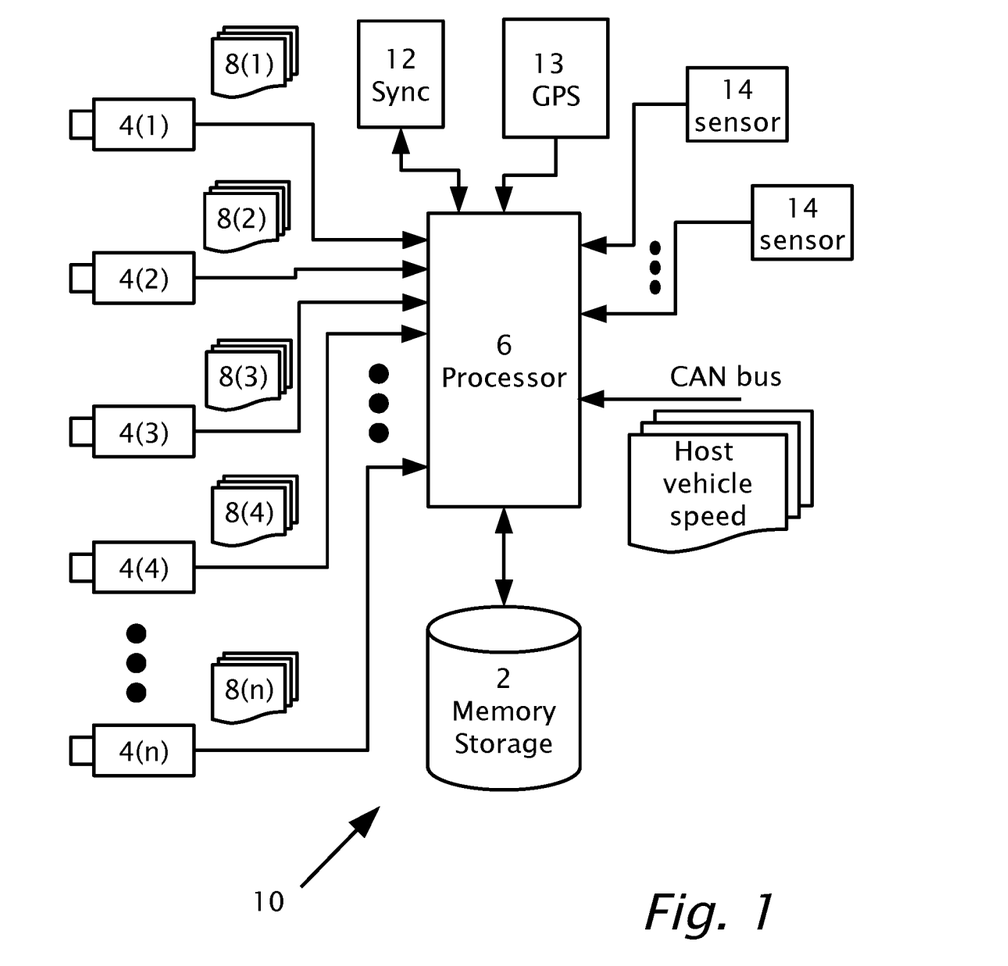
FIG. 1 illustrates a diagram of a system mountable in a host law enforcement vehicle, according to features of the present invention.

Referring now to the drawings, reference is now made to FIG. 1 which shows a diagram of a system 10, according to features of the present invention. Processor 6 is operatively connected to a memory storage 2. Processor 6 captures image frames 8(1) to 8(n) from respective cameras 4(1) to 4(n). Capture times may be stored as time stamps which record when image frames are captured. A global positioning system (GPS) unit 13 may provide geographical co-ordinates of system 10 to processor 6. Multiple sensor inputs to processor 6 are provided from sensors 14. Various sensors 14 may be included in system 10 including a gyroscope for measuring orientation, an accelerometer for measuring non-gravitational acceleration, a yaw sensor which measures a yaw angle of a host vehicle, a sensor 4 for measuring distance to an object. Distance sensor 14 may utilize laser imaging/detection and ranging (LIDAR) or ultrasonic techniques known in the art of distance sensing. A synchronization unit 12 may include a hardware circuit including a real time clock and trigger circuits which trigger the capture of the image frames 8(1) to 8(n) from the respective cameras 4(1) to 4(n) at known real times. Synchronization unit 12 may be used to synchronize the capture of the multiple image frames 8 from the respective cameras 4(1) to 4(n). Alternatively, a real time clock and trigger circuits may be incorporated into processor 6 and synchronization is performed by processor 6. Processor 6 may be connected to a CAN bus of the host vehicle, and may receive in real time speed data of the host vehicle.

Figure 2A:
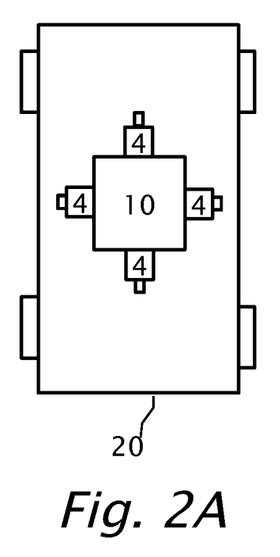
FIGS. 2A, 2B and 2C which illustrates various systems as in FIG. 1 mounted on the host vehicle, according to different camera configurations.
Figure 2B:
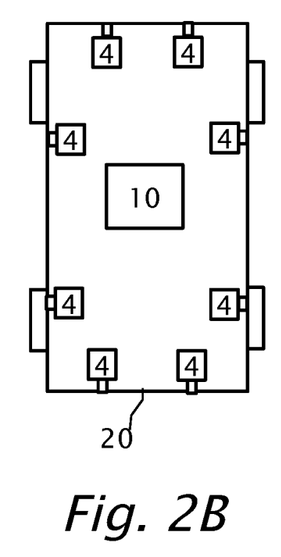
Figure 2C:
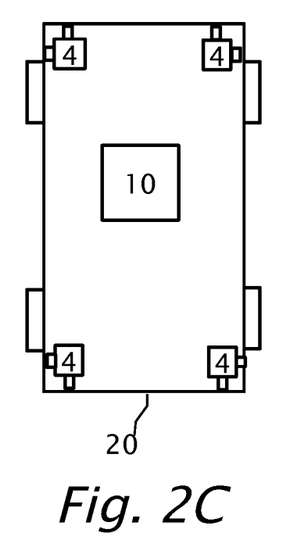

Reference is now made to FIGS. 2A, 2B and 2C which illustrates system 10 mounted on host vehicle 20, according to different configurations of the present invention. In the description that follows, cameras 4(1) to 4(n) may be mounted on the exterior of host vehicle 20 or in the interior of host vehicle 20 behind a window of host vehicle 20. FIG. 2A shows four cameras 4(1) to 4(4) mounted on a frame. The frame may be mounted on the exterior of the roof of host vehicle or on the roof in the interior of host vehicle 20.

FIG. 2B shows eight cameras 4(1) ... 4(8) mounted at on host vehicle 20. Two cameras 4 face forward, two cameras 4 face rearwards, two cameras 4 face leftwards and two cameras 4 face rightwards. Forward viewing cameras 4, rearward viewing cameras, left viewing cameras 4 and and right viewing cameras may be stereo cameras.

FIG. 2C shows eight cameras 4(1) ... 4(8) mounted at four corners of host vehicle 20. Each corner includes two cameras 4 with the optical axis of each camera 4 at substantially ninety degrees to each other in a substantially horizontal plane. The configuration of FIG. 2C may collocate two cameras in the same housing and may simplify installation and calibration compared with the configuration of eight cameras 4(1) ... 4(8) as shown as FIG. 2B.

Various examples of camera configurations are shown in FIGS. 2A-2C. Any number n of cameras 4, any type of cameras 4, field of views of cameras 4 and positions to mount cameras 4 may be chosen according to various aspects of the present invention.

Cameras 4 may be installed in an unmarked law enforcement vehicle and may be used to provide evidence with respect to a tailgating infraction. Cameras 4 may be configured to be always capturing image frames or cameras 4 may be signaled by the law enforcement officer to capture image frames. The processing of the image frames to determine if a tailgating infraction has occurred may be performed by post-processing, for instance when the law enforcement officer has returned to the police station. The processing of the image frames may involved multiple cameras. For instance, a tailgating infraction may be captured with a rear viewing camera 4 and then the with a side-viewing camera 4 and then with a forward viewing camera 4 as the two vehicles involved pass the law enforcement vehicle. Cameras 4 are synchronized so that the time differences between any image frames of any of cameras 4 are known. Moreover, the relative orientations and positions of cameras 4 mounted in host vehicle 20 are known so that world space coordinates of corresponding object points captured synchronously in different image frames from different cameras may be calibrated and positions of objects in world space may be continuously determined from image frames as viewed from camera 4 to another camera 4.

Figure 3:
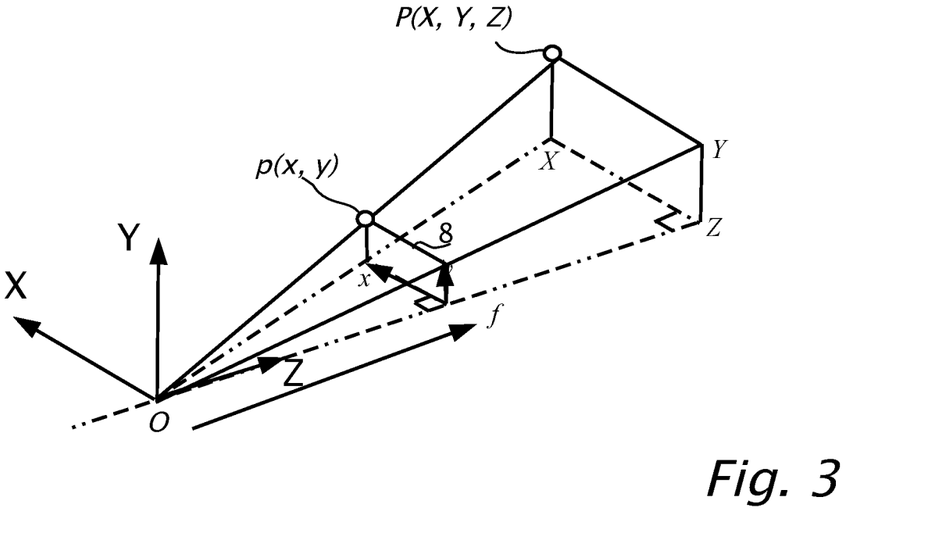
FIG. 3 illustrates camera or pinhole projection which relates a point P(X,Y,Z) in world space Cartesian coordinates to a point p(x,y) in image coordinates on an image plane.

Reference is now made to FIG. 3 which illustrates camera or pinhole projection which relates a point P(X,Y,Z) in world space Cartesian coordinates to a point p(x,y) image coordinates on image plane 8 where X is the horizontal Cartesian coordinate in world space, Y is the vertical Cartesian coordinate in world space and Z is the direction along the optical axis of the camera. The origin O of camera projection is at the pinhole, image plane 8 is in reality behind the origin at focal length f with the image inverted. Image plane 8 is shown in the projection of FIG. 3 in a symmetric position with a non-inverted image in front of origin O at a distance focal length f. The following equations approximate the relation between image coordinates x,y and world space coordinates X,Y,Z assuming camera or pinhole projection.

$$x = f\frac{X}{Z} \quad (1)$$

$$y = f\frac{Y}{Z} \quad (2)$$

Figure 4:
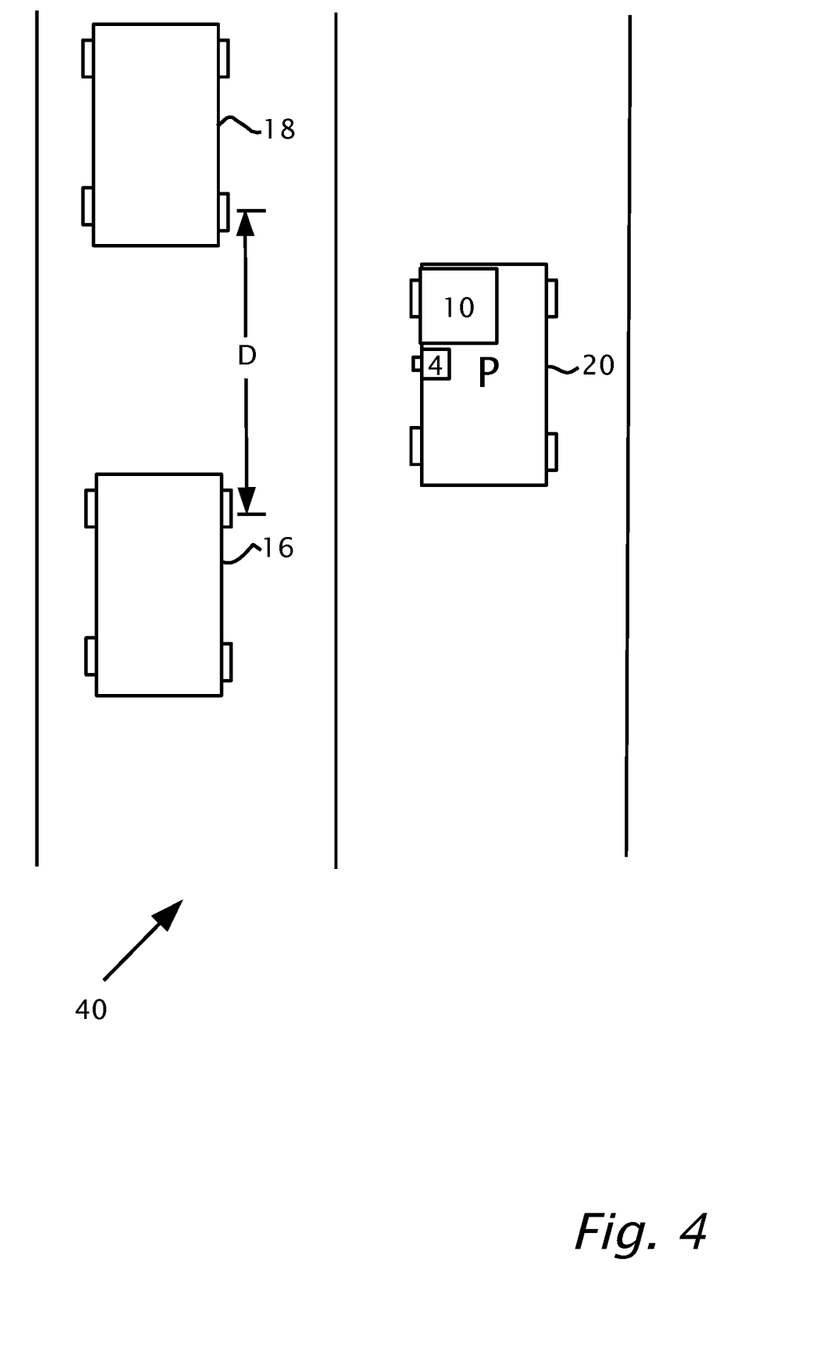
FIG. 4 illustrates a road scenario while using a system according to an aspect of the present invention for providing evidence with respect to a tailgating violation.

Reference is now made to FIG. 4, which illustrates road scenario 40 while using system 10, according to an aspect of the present invention for providing evidence with respect to a tailgating violation. Two lanes of traffic are shown. In the right lane, host vehicle, e.g. a law enforcement vehicle 20 is equipped with system 10 including a left viewing camera 4 viewing traffic in the left lane. In the left lane are traveling a lead vehicle 18 and a trailing vehicle 16. A distance D between trailing vehicle 16 and lead vehicle 18 is shown between a part of trailing vehicle 16, e.g. point of contact of the right front tire with the road of trailing vehicle 16 and/or a part of lead vehicle 18, e.g. point of contact of the right rear tire of lead vehicle 18 with the road.

Figure 5:
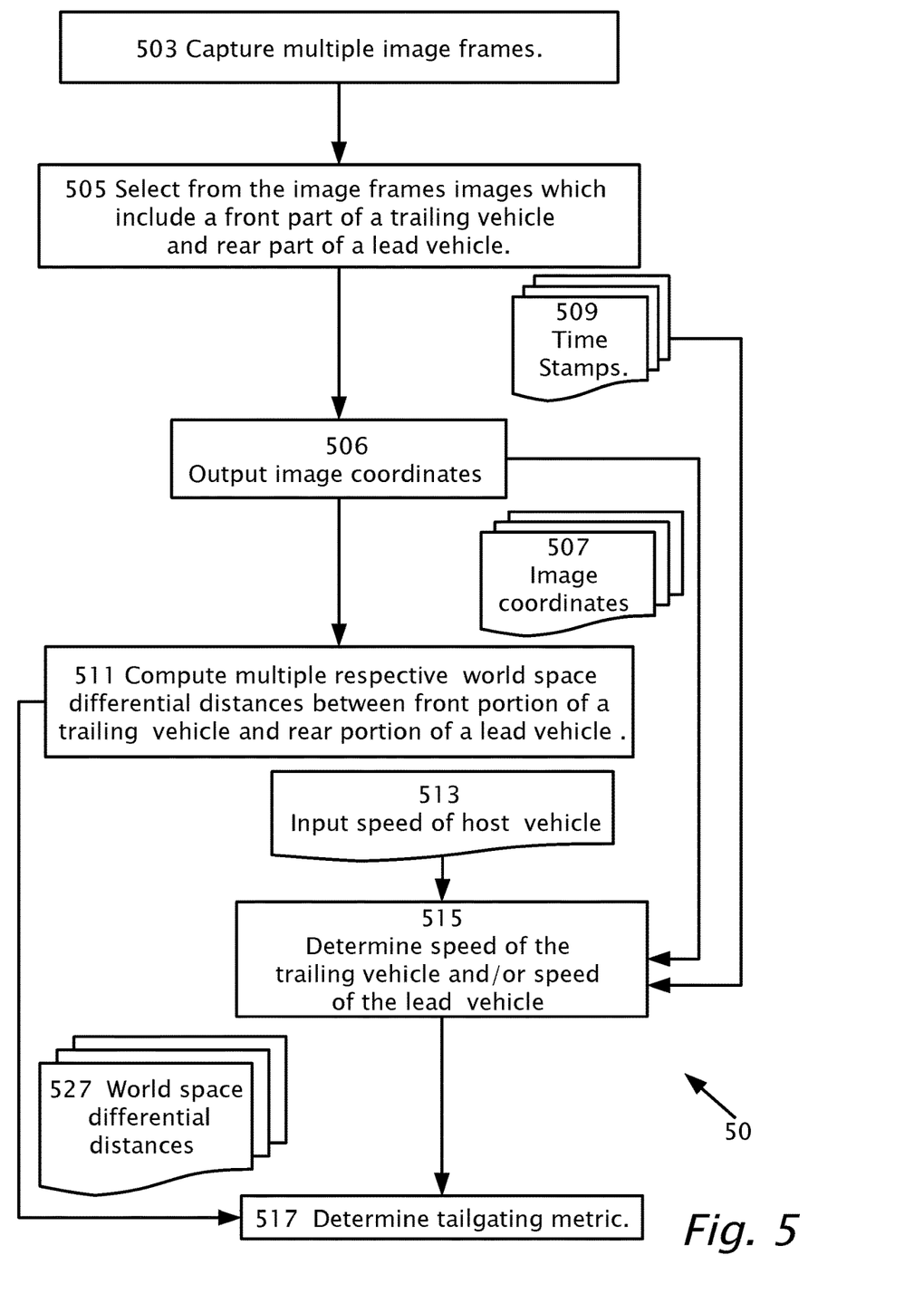
FIG. 5 includes a flow diagram generally illustrating a method according to features of the present invention.

Reference is now also made to FIG. 5 which includes a flow diagram illustrating a method 50 according to an embodiment of the present invention. In step 503, multiple image frames are captured using left viewing camera 4, as shown in FIG. 4, for example. Images are selected (step 505) from the image frames which include a part of trailing vehicle 16, e.g. point of contact of the right front tire with the road of trailing vehicle 16 and/or a part of lead vehicle 18, e.g. point of contact of the right rear tire of lead vehicle 18 with the road. Image coordinates 507 of selected points, e.g. the points of contact with the road are output (step 506) from the selected image frames. Time stamps 509 are output which represent the capture times of the selected image frames. Image coordinates 507 are used in step 511 to compute (step 511) world space distances 527 between the points of contact at the times 509 of capture (step 503).

In step 515, times stamps 509, input speed 513 of host vehicle 20 and/or world space distances 527 as measured between trailing vehicle 16 and lead vehicle 18 may be used to determine the speed of trailing vehicle 16 and/or speed of lead vehicle 18 or a function of speeds such as the average speed of vehicles 16 and 18 during a measured time interval derived from time stamps 509.

A tailgating metric may be determined (step 517) that may be determined whether the driver of trailing vehicle 16 was tailgating according to local traffic regulations from:
  world space distances 527 between trailing vehicle 16 and lead vehicle 18;
  a time interval determined from time stamps 509; and/or
  a speed (or function thereof) of trailing vehicle 16 and/or speed of lead vehicle 18; or a function thereof.

Referring back to road scenario 40 as shown in FIG. 4, host vehicle 20 may be an unmarked law enforcement vehicle traveling along the road. The law enforcement officer driving vehicle 20 on suspecting a potential tailgating violation in the left lane may attempt to stay in another road lane on the right to keep leading vehicle 18 and trailing vehicle 16 in view of left-viewing camera 4, while camera 4 is capturing image frames.

Figure 6:
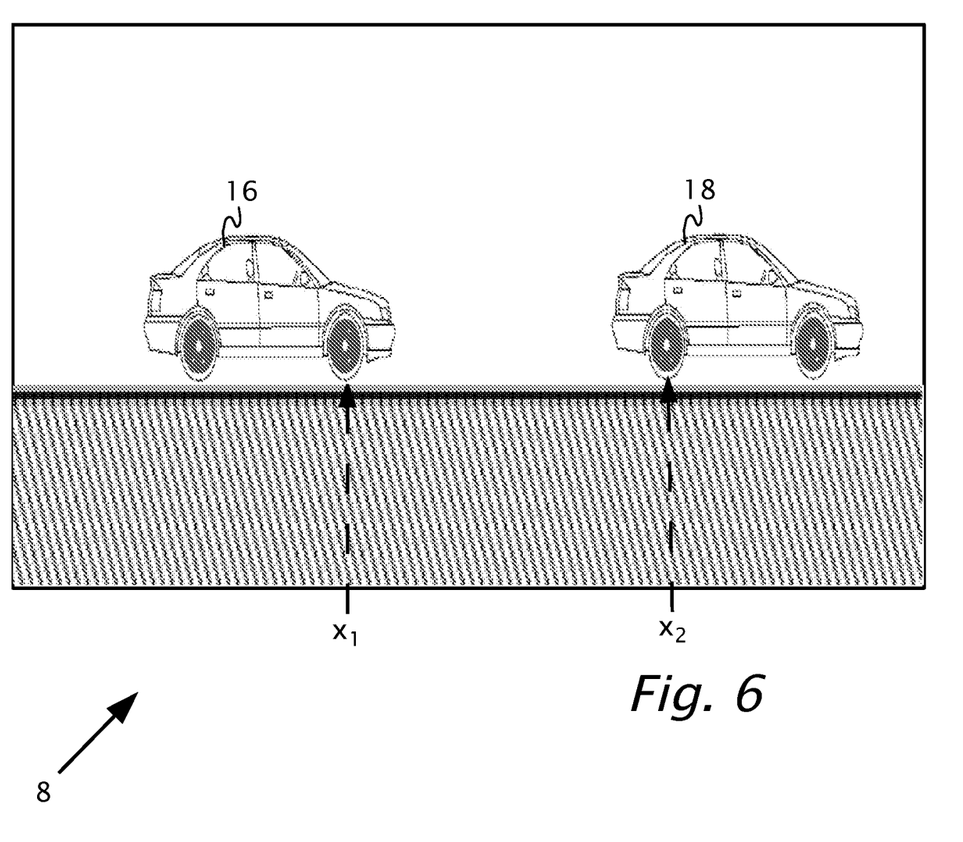
FIG. 6 illustrates an exemplary image frame captured using a side-viewing camera in the scenario shown in FIG. 4.

Reference is now made to FIG. 6 which illustrates an exemplary image frame 8 captured (step 503, FIG. 5) using scenario 40 (FIG. 4) and system 10 installed on vehicle 20 using a left-viewing camera 4. A horizontal image coordinate $x_1$ is shown marked with a dotted arrow which is the image point of the point of contact of the front right tire of trailing vehicle 16 with the road and a second dotted arrow is shown which marks the image point of the point of contact of the rear right tire of lead vehicle 18 with the road. From equation 1, it may be easily shown that the world space distance D along the road plane as shown in FIG. 4, assuming the road plane is horizontal and the vertical image coordinates $y_2$ and $y_1$ are the same, is given by:

$$D = Z \frac{(x_2 - x_1)}{f} \quad (3)$$

where D is the world space distance as a function of capture time from the selected part of trailing vehicle 16 to the selected part of lead vehicle 18. Z is the world space Z coordinate or range to the selected parts of trailing vehicle 16 and lead vehicle 18 from camera 4 and f is the focal length of camera 4. Range Z may be determined in different ways, according to different features of the present invention, as follows:

Range Z may be estimated (or at least an upper boundary may be found) from the lane markings and the widths of the road lanes. Specifically, lane width is normally a standard in a country or region with highway type with a known width such as 3.25 meters. A further refinement may be achieved by estimating the positions within respective lanes of host vehicle 20, trailing vehicle 16 and lead vehicle 18 from synchronized image frames 8 of any of cameras 4.

The vehicle model of trailing vehicle 16 may be recognized and a length, e.g. bumper to bumper or front wheel to rear wheel distances of the vehicle model may be known or determined. Using an image frame 8, for instance as shown in FIG. 6, horizontal image coordinates which mark the known vehicle length are determined from image 8, range Z may be determined using an equation similar to equation 3 using the measured horizontal image coordinates and the known focal length f. Even more simply, determining the range Z may be avoided by directly comparing image distance from trailing vehicle 16 to lead vehicle 18 to the imaged car length to find a scale factor and then the world space distance D is derived from the known car length using the same scale factor.

A range sensor may be used optionally synchronized with the capture of image frames 8, to measure the range (world space Z coordinate) to trailing vehicle 16.

Another method is to fully calibrate camera 4, that is to find external camera parameters over time during the image capture including X,Y,Z coordinates and two camera angles (pan and tilt) by using known information such as world space locations of objects being imaged. It is noteworthy that using methods according to various embodiments of the present invention, it is not generally necessary to fully calibrate camera 4 and simpler methods as discussed herein suffice.

In the discussion above, it has been assumed that the road plane is horizontal. In fact the road plane does not need to be horizontal. If there is a significant difference in the vertical image coordinates of the selected image points of trailing vehicle 16 and lead vehicle 18, then distance along the road plane may be calculated in the usual way by taking into account the vertical image coordinates.

Determination of speed of trailing vehicle 16 is performed relative the the known speed of host vehicle 20 which may be known from an input from the CAN bus. In the case that both trailing vehicle 16 and host vehicle 20 are traveling in the same direction on the road, image frames 8 may be used to determine the relative speed, again using equation 1. A fixed horizontal image coordinate is used which may be the center of image frame 8 or the center of radial distortion of camera 4. A second horizontal image coordinate is used which is on a selected part of the image of the trailing vehicle. The difference between the two image coordinates is a measure of the world space coordinate X along the road between host vehicle 20 and trailing vehicle 16. The change in the horizontal world space coordinate between two image frames 8 divided by the time difference given by the time stamps of the two image frames 8 yields the relative speed. In the case, that the law enforcement officer driving vehicle 20 succeeds to match the host vehicle speed with the trailing vehicle speed, the longer the trailing vehicle will be in field of view of camera 4 and the longer will be the video documenting the tailgating infraction.

Figure 7A:
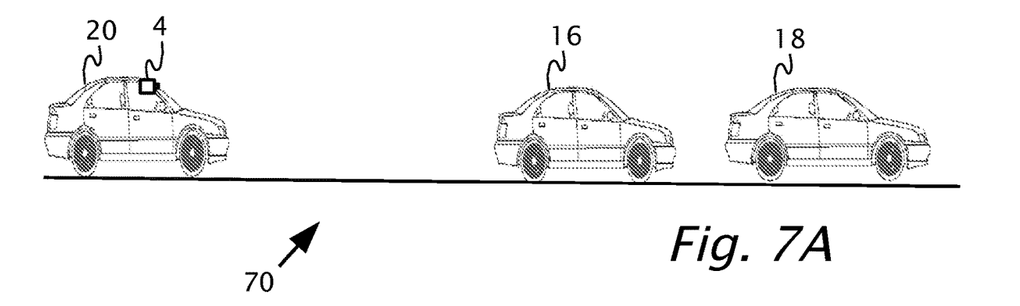
FIG. 7A illustrate another scenario using a system according to an aspect of the present invention for providing evidence with respect to a tailgating violation.
Figures 7B, 7C:
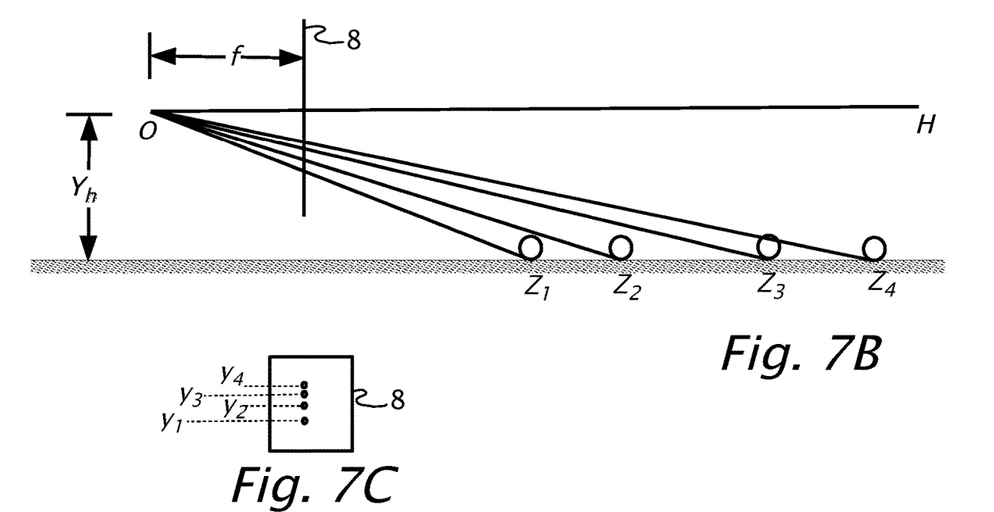
FIG. 7B shows a ray trace in camera projection for the scenario shown in FIG. 7A.
FIG. 7C shows image points of an image frame captured using the forward viewing camera of the scenario shown in FIG. 7A.

Reference is now made to FIGS. 7A, 7B and 7C which illustrate another aspect of the present invention. In an exemplary scenario 70 shown in FIG. 7A, a law enforcement host vehicle 20 uses system 10 including a forward viewing camera 4. Traveling ahead of host vehicle 20 are trailing vehicle 16 and lead vehicle 18 traveling along the same lane, an adjacent lane, or another lane parallel to the lane in which host vehicle 20 is traveling. Law enforcement officer in host vehicle 20, may suspect that trailing vehicle 16 is tailgating lead vehicle 18, and note the time and place of the suspected infraction, camera 4 may be always capturing images 8 or camera 4 may be signaled to capture image frames 8 by a user. Reference is now also made to FIG. 7B, which shows a ray trace in camera projection for scenario 70 shown in FIG. 7A. Two ranges $Z_1$ and $Z_2$ are marked which schematically show positions of the rear and front right side tires of trailing vehicle 16 and another two ranges $Z_3$ and $Z_4$ are marked which schematically show positions of the rear and front right side tires of lead vehicle 18. Also shown are image plane 8 which is a focal length f from origin O which represents the position of the pinhole of camera 4 using a pinhole camera model. (In a real camera, the image is inverted and image plane 8 is behind the lens at focal length f.) The height of camera 4 above the road plane is shown as $Y_h$. Optical axis OH of camera 4 is shown as parallel to road. Reference is now also made to FIG. 7C which shows the image points in image plane 8 of projections of contact points of the four tires with the road. The image points with vertical image coordinates $y_1$, $y_2$, $y_3$ and $y_4$ are shown to be aligned vertical with the same horizontal image coordinate, for simplicity and this is not generally the case. Ranges $Z_1$ $Z_2$, $Z_3$ and $Z_4$ may be directly determined using equation (2) above using the camera height $Y_h$ for the vertical world space coordinate Y. However, direct use of equation (2) may not provide satisfactory results if the optical axis OH of camera 4 is not parallel to the road. In this case, a two step approach may be used in which the closest range $Z_1$ is determined from a known horizontal dimension, e.g. width between the rear wheels of trailing vehicle 16. Using an equation similar in form to equation 3 above, and taking the world space width as D and the imaged dimension as $(x_2-x_1)$ then the range $Z_1$ to the point of contact between the wheels and the road may be estimated. Accordingly, the angle of optical axis OH to the road plane may be adjusted or the horizon line in image 8 may be adjusted to provide correct values of ranges $Z_2$ and $Z_3$.

In the scenario of FIG. 7A, the relative speed of the trailing vehicle 16 to host vehicle 20 may be determined by measuring the range $Z_1$ for image frames 8 captured at different times, the time difference is given from time stamps 509. The actual speed in world space of trailing vehicle 16 is the relative speed determined from image frames 8 added to the host vehicle speed.

Using Stereo Cameras for Measuring Distances Between Trailing and Leading Vehicles The three-dimensional (3D) world space position (X,Y,Z) of a point P relative to position and orientation of host vehicle 20, can be reconstructed from the perspective or the camera projection of point P on the image planes of stereo cameras 4, once the relative position and orientation of cameras 4 are known.

For cameras 4 with parallel optical axes, the equations of stereo triangulation are:

$$Z = b \frac{f}{(x_1 - x_2)} \quad (4)$$

$$X = x_1 \frac{Z}{f} \quad (5)$$

$$Y = y_1 \frac{Z}{f} \quad (6)$$

where b is the baseline distance between the origins or pinholes in the pinhole model or in real cameras 4 the distance between the lens centers. The range or Z coordinate is proportional to the baseline distance and inversely proportional to the disparity $(x_1-x_2)$ which is the difference between the horizontal image coordinates respectively of the left and right cameras 4 of corresponding points $p_1$ and $P_2$ in image frames 8 captured at the same time.

Figure 8A:
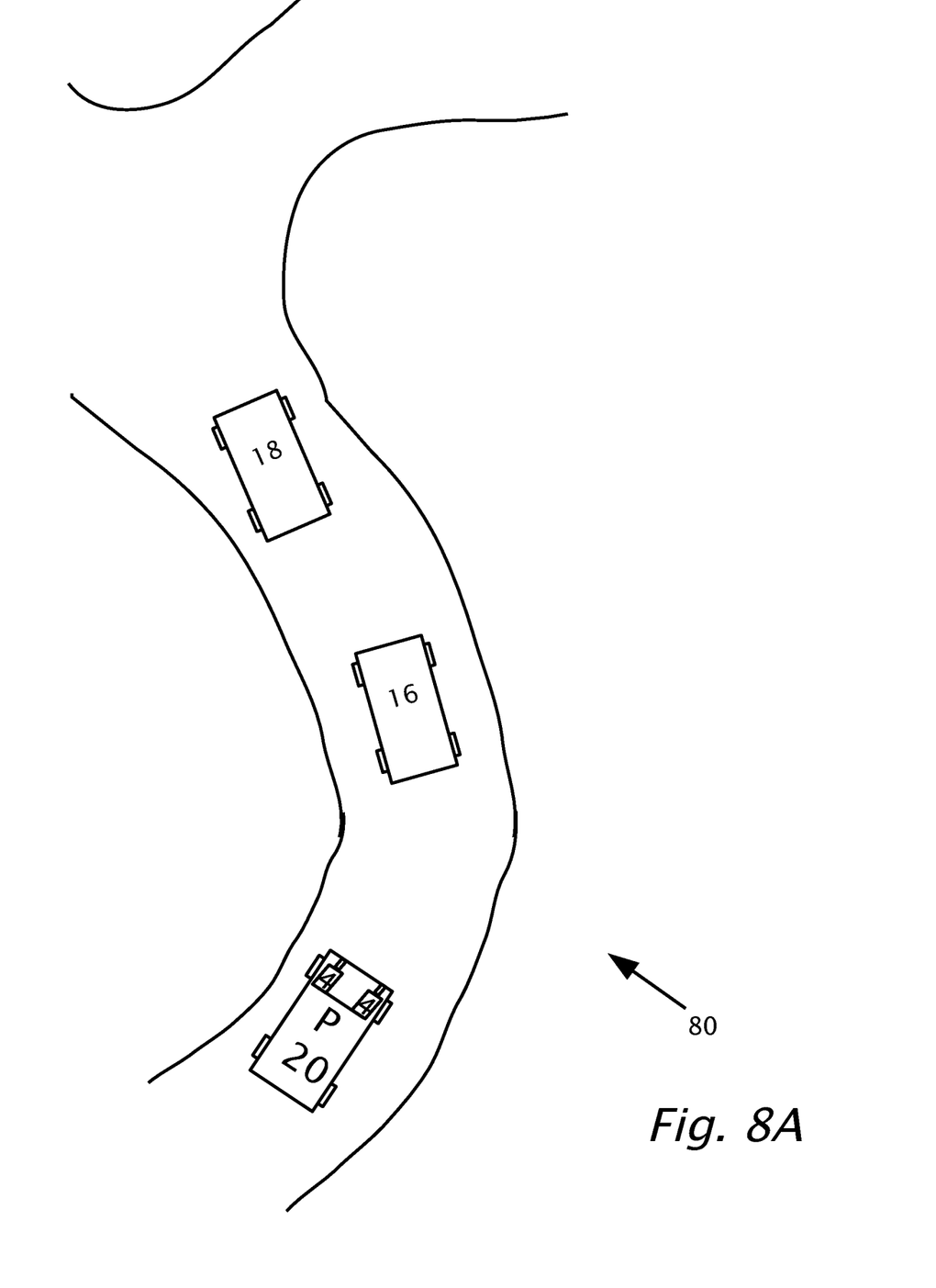
FIG. 8A shows a road scenario in which a law enforcement host vehicle follows a trailing vehicle suspected of tailgating a lead vehicle on a curved road.
Figure 8B:
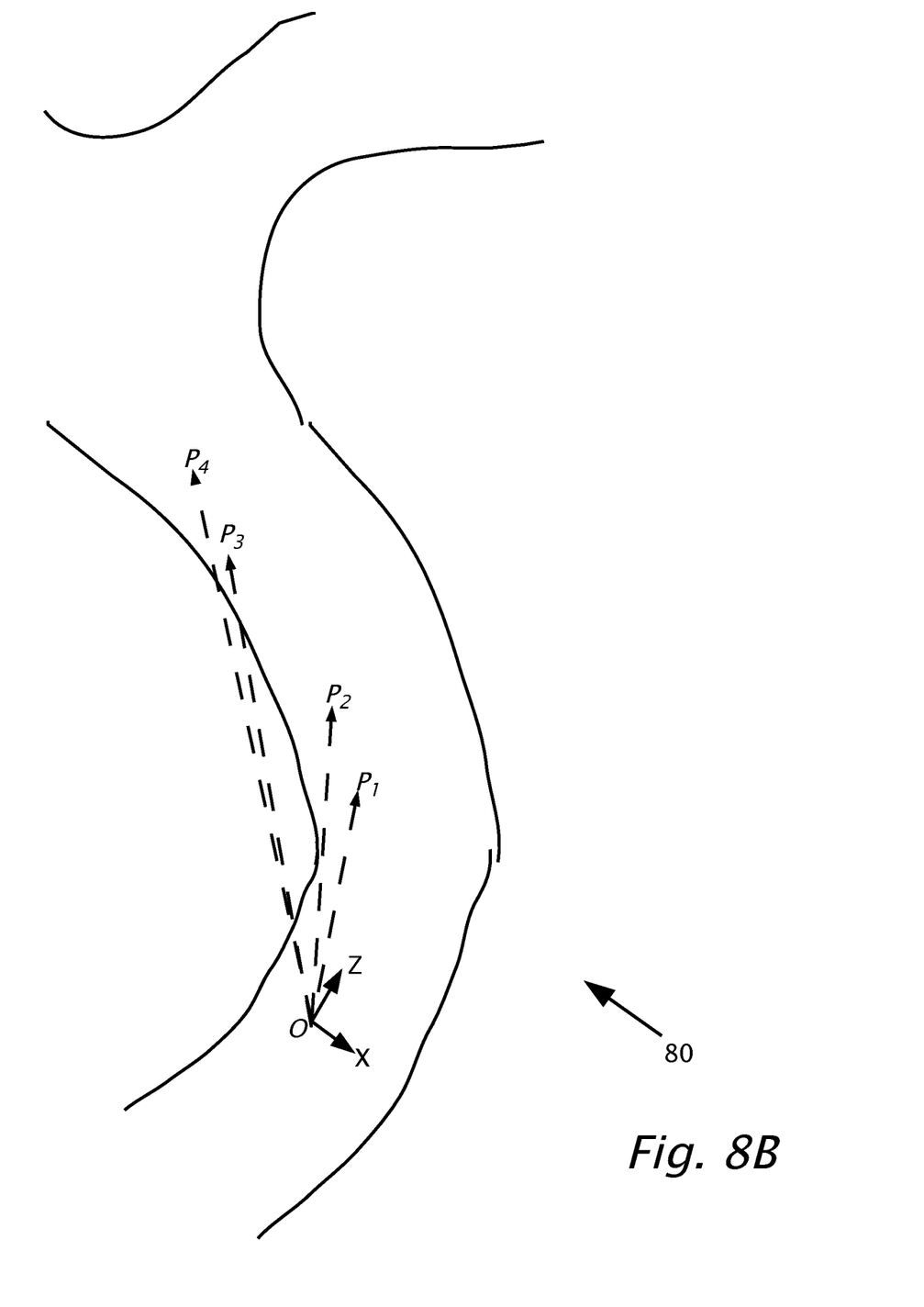
FIG. 8B shows further details of the scenario shown in FIG. 8A.

Reference is now made to FIG. 8A which shows a road scenario 80 in which a law enforcement host vehicle 20 follows trailing vehicle 16 suspected of tailgating lead vehicle 18 on a curved road. Host vehicle 20 is equipped with a pair of stereo cameras 4 with overlapping fields of view. Capture of image frames 8 of stereo cameras 4 is synchronized. Reference is now also made to FIG. 8B which shows the same road scenario 80 with a Cartesian coordinate system located on the baseline of stereo cameras 4. Four vectors are shown with dotted lines which mark in world space displacement from the origin to selected points $P_1, P_2$, on trailing vehicle 16 and points $P_3, P_4$ on leading vehicle 18. In the example, points $P_1, P_2$, are located on the contact points of the right rear tire and right front tire respectively with the road of trailing vehicle 16 and points $P_3, P_4$ are located on the contact points of the right rear tire and right front tire respectively with the road of lead vehicle 18. In left and right image frames 8 captured at the same time (with identical time stamps) corresponding points $(p_{11}, p_{12})$, $(p_{21}, p_{22})$, $(p_{31}, p_{32})$ and $(p_{41}, p_{42})$ may be located for each of the left and right image frames. The first index refers to the imaged contact points and the second index refers to the left and right cameras. The disparity values $(x_{12}-x_{11})$, $(x_{22}-x_{21})$, $(x_{32}-x_{31})$, $(x_{42}-x_{41})$ may be used to determine Z-coordinates $Z_1, Z_2, Z_3$ and $Z_4$ respectively using equation (4) above. The world space X and Y coordinates corresponding to the world space locations of the wheels of trailing vehicle 16 and lead vehicle 18 of may be determined from one or both camera image frames 8 using equations (5) and (6). The length in world space of the vectorial difference $OP_3-OP_2$ gives the distance between trailing vehicle 16 and lead vehicle 18 correcting for wheel to bumper distances, if necessary or appropriate according to local regulations.

Verification or further calibration of the results may be found by insuring that for all image frames 8 used, the length of the vectorial difference $OP_1-OP_2$ equals the actual distance between front and rear wheels of the recognized vehicle model of trailing vehicle 16. Similarly, the vectorial difference $OP_4-OP_3$ may be used for verification or further calibration using the recognized model lead vehicle 18.

The speed of trailing vehicle 16 may be determined using the speed of host vehicle 20, the time stamps of the captured image frames 8 changes in distances of vector $OP_1$, the distance from host vehicle 20 to trailing vehicle 16.

Use of System 10 for Enforcement of Speeding Violations

Laser radar or LIDAR is used to detect speeding violations However, LIDAR systems are directed essentially in line with the road on which vehicles are traveling. System 10 allows for determination of speeding violations from different directions when use of a LIDAR system is unavailable. Determination of violating a speeding regulation has been disclosed above in the context of determination of tailgating violations. In brief, enforcement of a speed violation may be performed by system 10 (FIG. 1) mounted in a host vehicle 20 in different configurations such as those shown in FIGS. 2A, 2B and 2C.

Speed of a target vehicle may be determined relative to the speed of host vehicle 20 which is known for instance from the CAN bus. When a camera 4 is used to determine speed relative to the speed of the host vehicle moving in essentially the same direction to the alleged violating vehicle, the accuracy of the speeding measurement is significantly increased. Measurement of speed may be performed using either a side-viewing, rear-viewing, forward viewing camera 4 and/or combinations thereof. Alternatively, speed of a vehicle may be determined if host vehicle 20 is unmoving or parked.

Thus, various computerized methods and systems are disclosed herein for determining that a vehicle is speeding in violation of a speeding regulation. A camera captures a timed sequence of image frames at known capture times of the vehicle. Images of at least a part of the vehicle are selected from the captured image frames to provide respective image coordinates of the vehicle in the selected images. World space coordinates (X,Z) are computed from the image coordinates. A speed of the vehicle suspected to have violated the speeding violation may be determined responsive to the known capture times of selected image frames and the world space coordinates.

A vehicle model of the vehicle may be recognized from the captured image frames. One or more dimensions of the vehicle model may be known, the computation of the world space coordinates (X,Z) may be further responsive to the known dimension(s) of the recognized vehicle model.

The image frames may be captured by a camera with an optical axis substantially perpendicular to the direction of motion of the vehicles, i.e. viewing from the side, and world space coordinates (X,Z) may be determined relative to the known dimension(s) of the vehicle model. The world space coordinate Z (or range) may be determined from the image frames or measured independently from the image frames using another sensor. The image frames may be captured by a camera with an optical axis substantially parallel to the direction of motion of the vehicles and the world space coordinates (X,Z) may be calibrated relative to the known at least one dimension of the car model. One or more of the selected images may provide an image of a license plate of the trailing vehicle. The license number may be recognized to associate with and to determine the vehicle model of the vehicle.

The camera may be mountable on a host vehicle and may be connected to a processor and the processor may be connected to a CAN bus of the host vehicle. While the host vehicle is traveling in a lane of the road parallel to the lane of the road on which the lead vehicle and the trailing vehicle are traveling, the speed of the host vehicle may be input to the processor from the CAN bus and the speed of the trailing vehicle and/or the lead vehicle may be determined relative to the speed of the host vehicle. While the host vehicle is unmoving, the speed of the vehicle may be determined by computing world coordinates (X,Z) from the image coordinates at the known capture times.

The term "capture times" as used herein refers to times relative to an initial time which may be a time of capture of a first image frame of a series of image frames and/or capture times may refer to real time in calendar year, month, day, hours and/or seconds. The term "synchronize" as used herein or "synchronous" with reference to different cameras, refer to arranging the capture times so the time intervals between time stamps of different captured image frames from different cameras are known. With reference to stereo cameras, the term "synchronous" means that the capture times of corresponding image frames are the same.

The term "tailgating metric" as used herein, refers to a measurement of distance between a trailing vehicle and a lead vehicle optionally in combination with speed (of the trailing vehicle) and a time duration of the suspected tailgating infraction during which the time and speed are maintained. The details of the "tailgating metric" may depend on local statutes or regulations.

The term "corresponding" as used herein refers to an image point associated with an object point. The term "corresponding" as used herein in the context of stereo or overlapping fields of view of multiple cameras with synchronized capture, refers to multiple image points of the same object point captured at the same time.

The term "range" as used herein refers to the Cartesian world space coordinate usually parallel to the optical axis of a camera and usually denoted as Z.

The indefinite articles "a", "an" is used herein, such as "a camera", "an object point" have the meaning of "one or more" that is "one or more cameras" or "one or more object points".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The invention claimed is:

1. A computerized method for determining that a trailing vehicle is tailgating a lead vehicle while both are traveling on a lane of a road with the trailing vehicle following the lead vehicle, the method comprising:

while a camera is mounted on a moving host vehicle and connected to a processor, capturing from a camera a timed sequence of image frames at known capture times of the lead vehicle and the trailing vehicle;

selecting from the captured image frames selected images of at least a part of the trailing vehicle and at least a part of the lead vehicle, thereby providing respective image coordinates of the trailing vehicle and the lead vehicle in the selected images;

computing responsive to the image coordinates in the selected image frames a plurality of respective world space differential distances between the trailing vehicle and the lead vehicle;

selecting from at least one of the captured image frames a first image point corresponding to an object point on the trailing vehicle and selecting from the at least one captured image frame a second image point corresponding to an object point on the lead vehicle, wherein the first and second image points correspond to world space points defining a line in world space parallel to or included in the plane of the road, wherein the line is parallel to the direction of motion of the trailing vehicle and the lead vehicle, wherein the world space differential distances are computed along said line; and determining a tailgating metric responsive to the known capture times of the selected image frames and the computed world space differential distances.

2. The computerized method of claim 1, wherein at least one of captured image frames includes the selected images of both the part of the trailing vehicle and the part of the lead vehicle.

3. The computerized method of claim 1, wherein at least one of captured image frames includes the selected image of the part of the trailing vehicle and another of the selected images includes the part of the lead vehicle.

4. The computerized method of claim 1, further comprising:

recognizing from the captured image frames a vehicle model of at least one of the trailing vehicle and the lead vehicle, wherein at least one dimension of the vehicle models is known, wherein said computing the world space differential distances is further responsive to the at least one known dimension of the recognized car model.

5. The computerized method of claim 4 wherein the image frames are captured by a camera with an optical axis substantially perpendicular to the direction of motion of the vehicles and wherein the distance between the trailing vehicle and the lead vehicle is determined relative to the known at least one dimension of the car model.

6. The computerized method of claim 4, wherein the image frames are captured by a camera with an optical axis substantially parallel to the direction of motion of the vehicles and wherein the distance between the trailing vehicle and the lead vehicle is determined relative to the known at least one dimension of the car model.

7. The computerized method of claim 1, wherein at least one of said selected images provides an image of a license plate of the trailing vehicle, and wherein the license number is recognized to associate with the vehicle model and to determine the vehicle model of the trailing vehicle.

8. The computerized method of claim 1, wherein said computing the world space differential distances is further responsive to a range to at least one of the trailing vehicle and the lead vehicle, wherein the range may be determined from the image frames or the range may be measured independently from the image frames using another sensor.

9. The computerized method of claim 1, further comprising:
- computing from the image coordinates, world space coordinates (X,Z) of the at least one of the trailing vehicle and the lead vehicle; and
- responsive to the known capture times of the selected image frames and the world space coordinates (X,Z), computing a speed of at least one of the trailing vehicle and the lead vehicle.

10. The computerized method of claim 1, wherein the tailgating metric is determined based on the computed world space distances and speed of the trailing vehicle.

11. The computerized method of claim 1, wherein the tailgating metric is determined further based on a time interval between respective capture times of two of the selected captured image frames.

12. The computerized method of claim 1, while the processor is connected to a CAN bus of the host vehicle, the method further comprising:
- while the host vehicle is traveling in a lane of the road parallel to the lane of the road on which the lead vehicle and the trailing vehicle are traveling, inputting from the CAN bus the ground speed of the host vehicle; and
- from the captured image frames and the known capture times determining the speed of at least one of the trailing vehicle and the lead vehicle relative to the ground speed of the host vehicle.

13. A system including a camera and processor, the system mountable on a moving host vehicle for determining that a trailing vehicle is tailgating a lead vehicle while both are traveling on a lane of a road with the trailing vehicle following the lead vehicle, the system operable to:
- capture from a camera a timed sequence of image frames at known capture times of the lead vehicle and the trailing vehicle;
- select from the captured image frames selected images of at least a part of the trailing vehicle and at least a part of the lead vehicle, thereby providing respective image coordinates of the trailing vehicle and the lead vehicle in the selected images;
- compute responsive to the image coordinates in the selected image frames a plurality of respective world space differential distances between the trailing vehicle and the lead vehicle;
- select from at least one of the captured image frames a first image point corresponding to an object point on the trailing vehicle and select from the at least one captured image frame a second image point corresponding to an object point on the load vehicle, wherein the first and second image points correspond to world space points defining a line in world space parallel to or included in the plane of the road, wherein the line is parallel to the direction of motion of the trailing vehicle and the lead vehicle, wherein the world space differential distances are computed along said line; and
- determine a tailgating metric responsive to the known capture times of the selected image frames and the computed world space differential distances.

14. The system of claim 13, further configured to recognize from the captured image frames a vehicle model of at least one of the trailing vehicle and the lead vehicle, wherein at least one dimension of the vehicle models is known, wherein the world space differential distance are further responsive to the at least one known dimension of the recognized car model.

15. The system of claim 13, wherein the image frames are captured by a camera with an optical axis substantially perpendicular to the direction of motion of the vehicles and wherein the distance between the trailing vehicle and the lead vehicle is determined relative to the known at least one dimension of the car model.

16. The system of claim 13, wherein the image frames are captured by a camera with an optical axis substantially parallel to the direction of motion of the vehicles and wherein the distance between the trailing vehicle and the lead vehicle is determined relative to the known at least one dimension of the car model.

17. The system of claim 13, wherein at least one of said selected images provides an image of a license plate of the trailing vehicle, and wherein the license number is recognized to associate with and to determine the vehicle model of the trailing vehicle.

18. The system of claim 13, wherein the world space differential distances are responsive to a range to at least one of the trailing vehicle and the lead vehicle, wherein the range may be determined from the image frames or the range may be measured independently from the image frames using another sensor.

19. The system of claim 13, wherein the processor is connectable to a CAN bus of the host vehicle, wherein the system is configured to input from the CAN bus the ground speed of the host vehicle, and from the captured image frames and the known capture times determine the speed of at least one of the trailing vehicle and the lead vehicle relative to the ground speed of the host vehicle.

20. A system mountable on a moving host vehicle for determining that a trailing vehicle is tailgating a lead vehicle while both the trailing vehicle and the lead vehicle are traveling on a lane of a road with the trailing vehicle following the lead vehicle, the system comprising:
- multiple cameras mountable on the host vehicle with overlapping fields of view:
- a processor configured to capture from the cameras timed sequences of image frames at known capture times of the lead vehicle and the trailing vehicle, wherein the capture of the timed sequences of images frames are synchronized, wherein the processor is further configured to:
- select from the captured image frames corresponding image points between the synchronized image frames of at least a part of the trailing vehicle and at least a part of the lead vehicle to provide thereby respective image coordinates of the trailing vehicle and the lead vehicle in at least a portion of the captured image frames;
- compute responsive to the image coordinates of the corresponding image points in the synchronized image frames a plurality of world space differential distances between the trailing vehicle and the lead vehicle;
- select from at least one of the captured image frames a first image point corresponding to an object point on the trailing vehicle and select from the at least one captured image frame a second image point corresponding to an object point on the lead vehicle, wherein the first and second image points correspond to world space points defining a line in world space parallel to or included in the plane of the road, wherein the line is parallel to the direction of motion of the trailing vehicle and the lead vehicle, wherein the world space differential distances are computed along said line; and
- determine a tailgating metric responsive to the known capture times of the selected image frames and the computed world space differential distances.

* * * * *